March 5, 1968 T. WAPLAN 3,371,598
BARK PRESS

Filed Sept. 21, 1965 6 Sheets-Sheet 1

INVENTOR.
Thure Waplan
BY
Cushman, Darby & Cushman
Attorneys

March 5, 1968  T. WAPLAN  3,371,598
BARK PRESS
Filed Sept. 21, 1965  6 Sheets-Sheet 3

INVENTOR.
Thure Waplan
BY
Cushman, Darby & Cushman
Attorneys

March 5, 1968 T. WAPLAN 3,371,598
BARK PRESS
Filed Sept. 21, 1965 6 Sheets-Sheet 5

INVENTOR.
Thure Waplan
BY
Cushman, Darby & Cushman
Attorneys

March 5, 1968 T. WAPLAN 3,371,598
BARK PRESS
Filed Sept. 21, 1965 6 Sheets-Sheet 6

United States Patent Office 3,371,598
Patented Mar. 5, 1968

3,371,598
BARK PRESS
Thure Waplan, Saltsjo-Duvnas, Sweden, assignor to Waplans Mekaniska Verkstads a.-b., Vaplan, Sweden, a corporation of Sweden
Filed Sept. 21, 1965, Ser. No. 488,967
Claims priority, application Sweden, Sept. 24, 1964, 11,613/64
6 Claims. (Cl. 100—166)

ABSTRACT OF THE DISCLOSURE

A bark press comprising a central roller, at least four squeeze rollers mounted in movable bearings and elastically pressed toward the central roller, and scrape and guide members intermedate the squeeze rollers for removing bark from one squeeze roller and guiding the bark to the gap between the following squeeze roller and the central roller. The central roller and squeeze rollers have longitudinal indentations for breaking up and advancing the bark and complementary peripheral ridges which facilitate the squeezing of liquid from the bark.

---

This invention relates to a bark press.

Prior-art bark presses comprising a central roller having a horizontal shaft suffer from several disadvantages. For instance, a bark press in which a continuous mat of chains is pressed against a portion of the peripheral surface of the central roller for dewatering the bark suffers from the inconvenience that, in order to obtain the required, evenly distributed pressure against the central roller, the mat of chains has to be so tight that the removal of the water from the mass of bark is rendered difficult. Another inconvenience is due to the fact that during the pressing operation part of the bark adheres to the central roller, this inconvenience being also met with other types of conventional bark presses.

One object of this invention is to eliminate the above named disadvantages and to provide an effectively operating bark press in which dewatering occurs substantially radially such that the water flows off the cake of bark along the shortest path. Another object is to provide a bark press which in a simple manner breaks the mass of bark supplied to small pieces, advantageously distributes the mass of bark over squeeze rollers and while preventing the mass of bark from adhering to the squeeze rollers guides the movement of the cake of bark prior to and after successive pressing operations. A further object is to provide a simple and yet stable and robust bark press which without being liable to disturbances permits effective and reliable operation at high capacity under difficult conditions.

These and other objects of the invention will appear from the following description of an embodiment illustrated in the annexed drawings.

Figure 1:
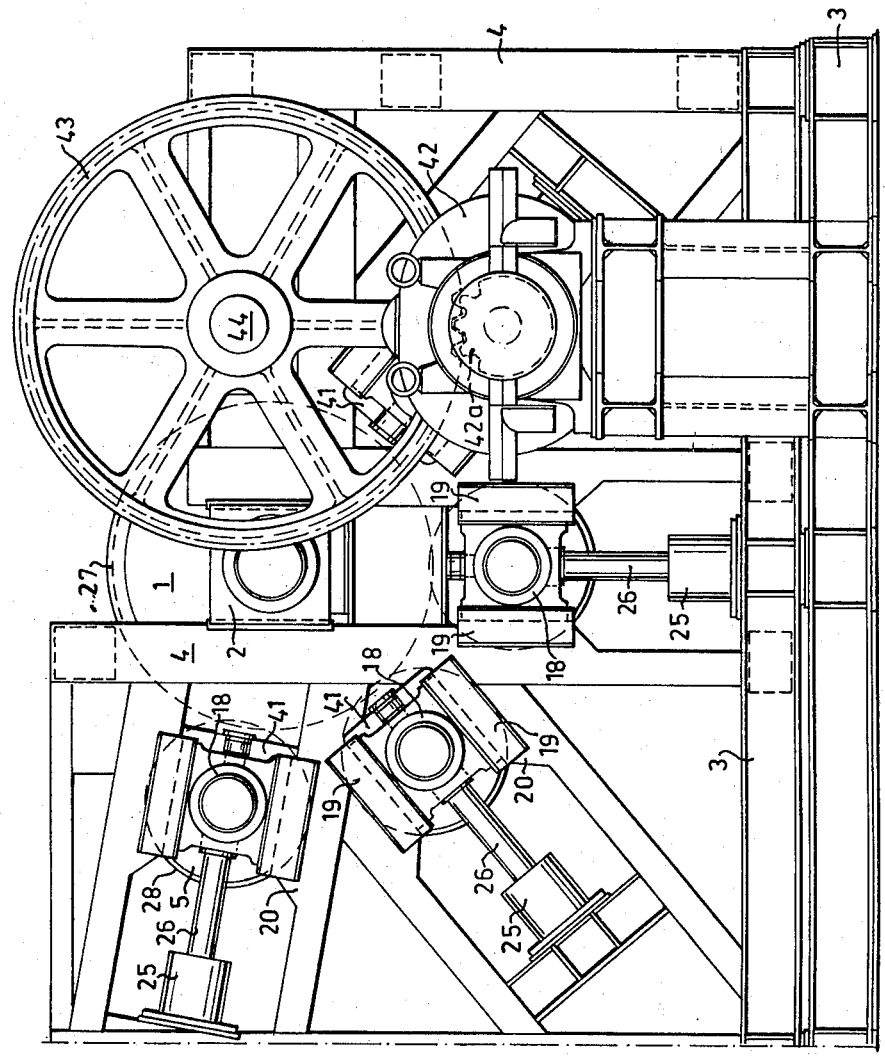
Figure 2:
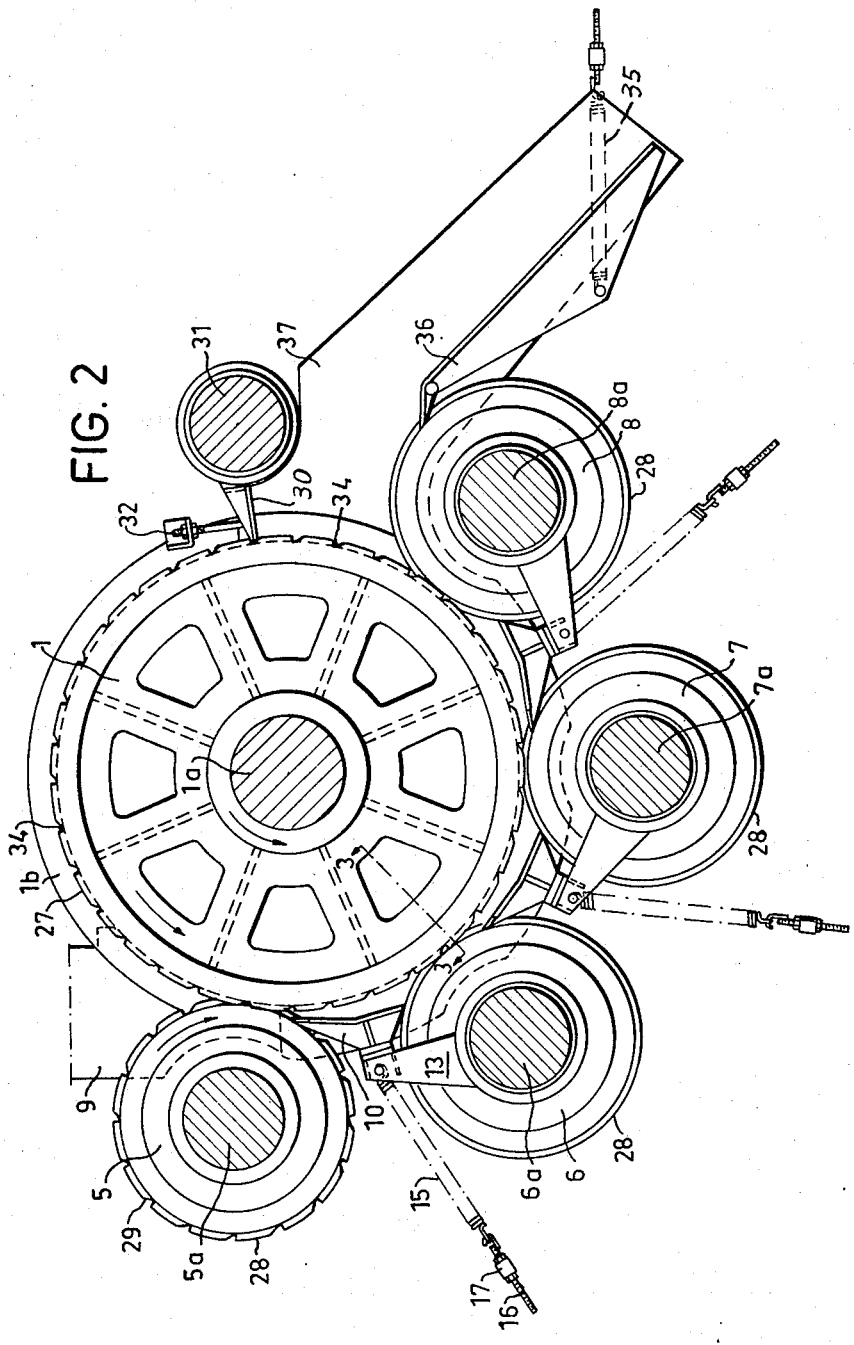
Figure 3:
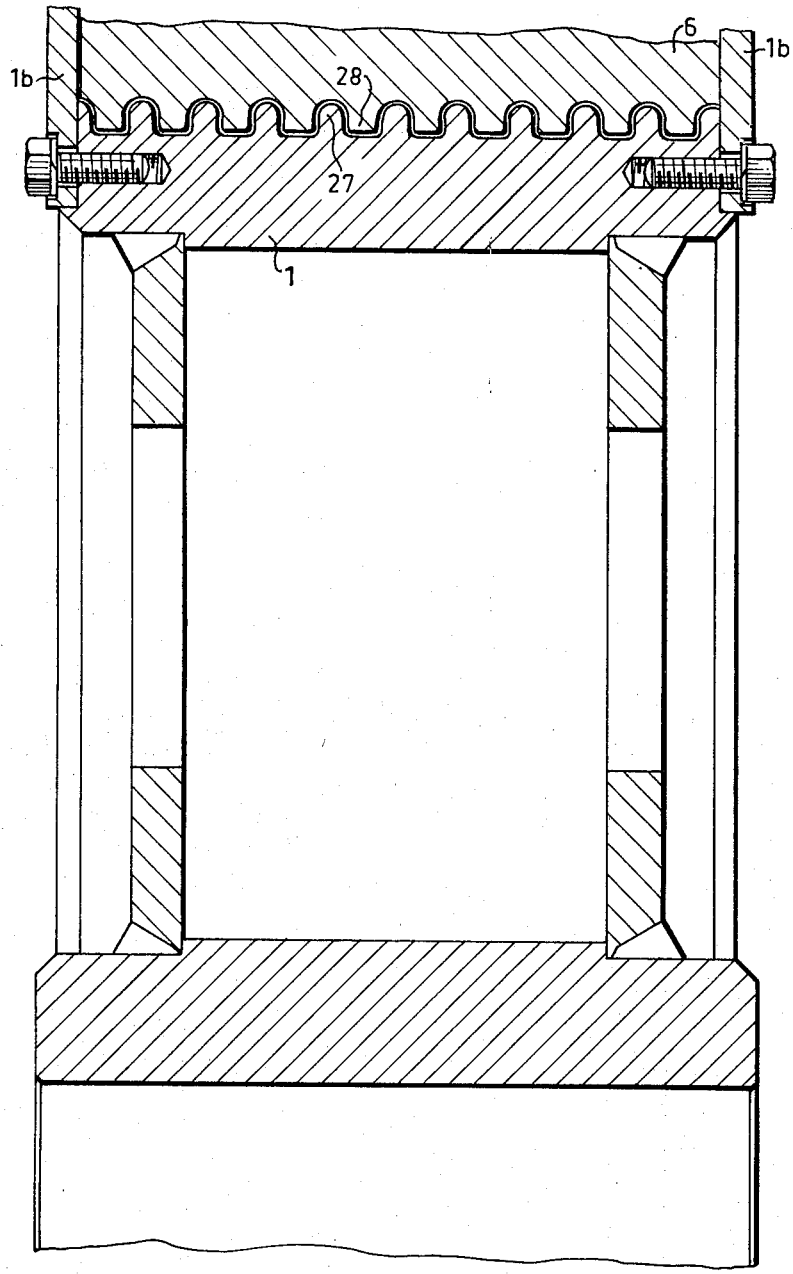
Figure 4:
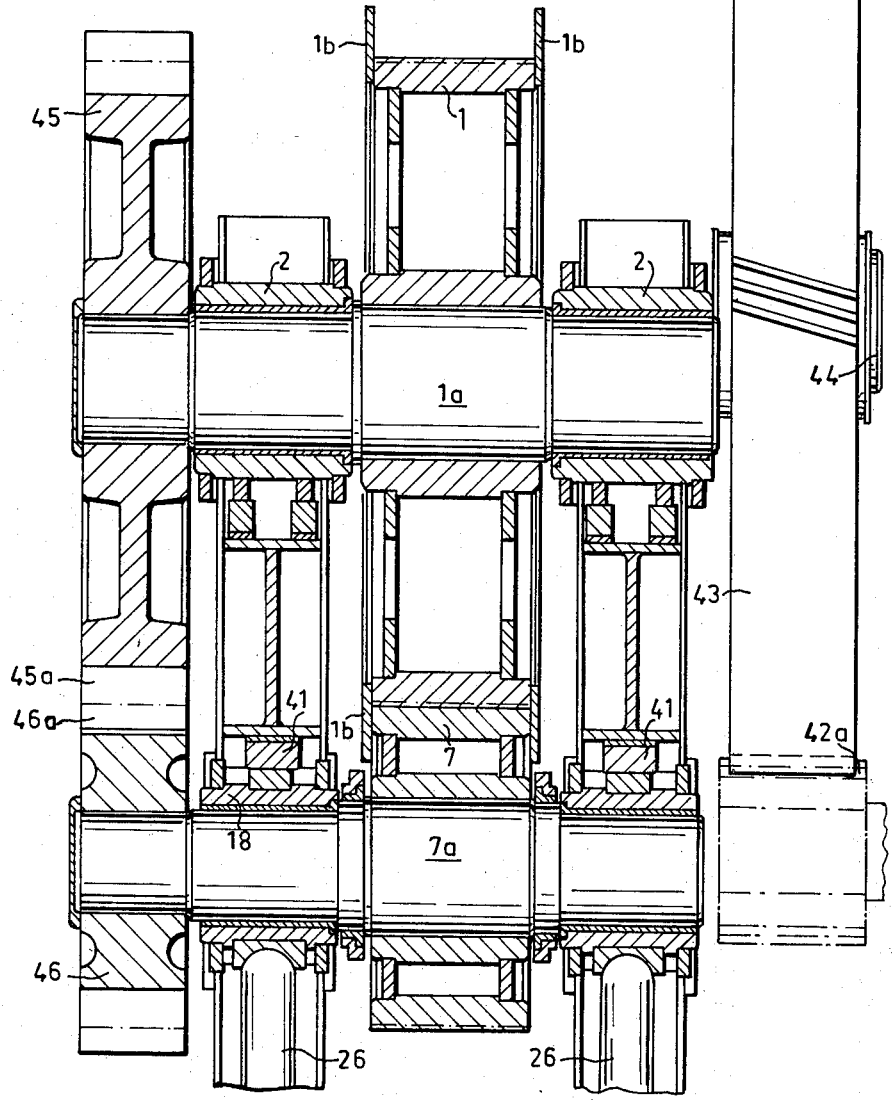
Figure 5:
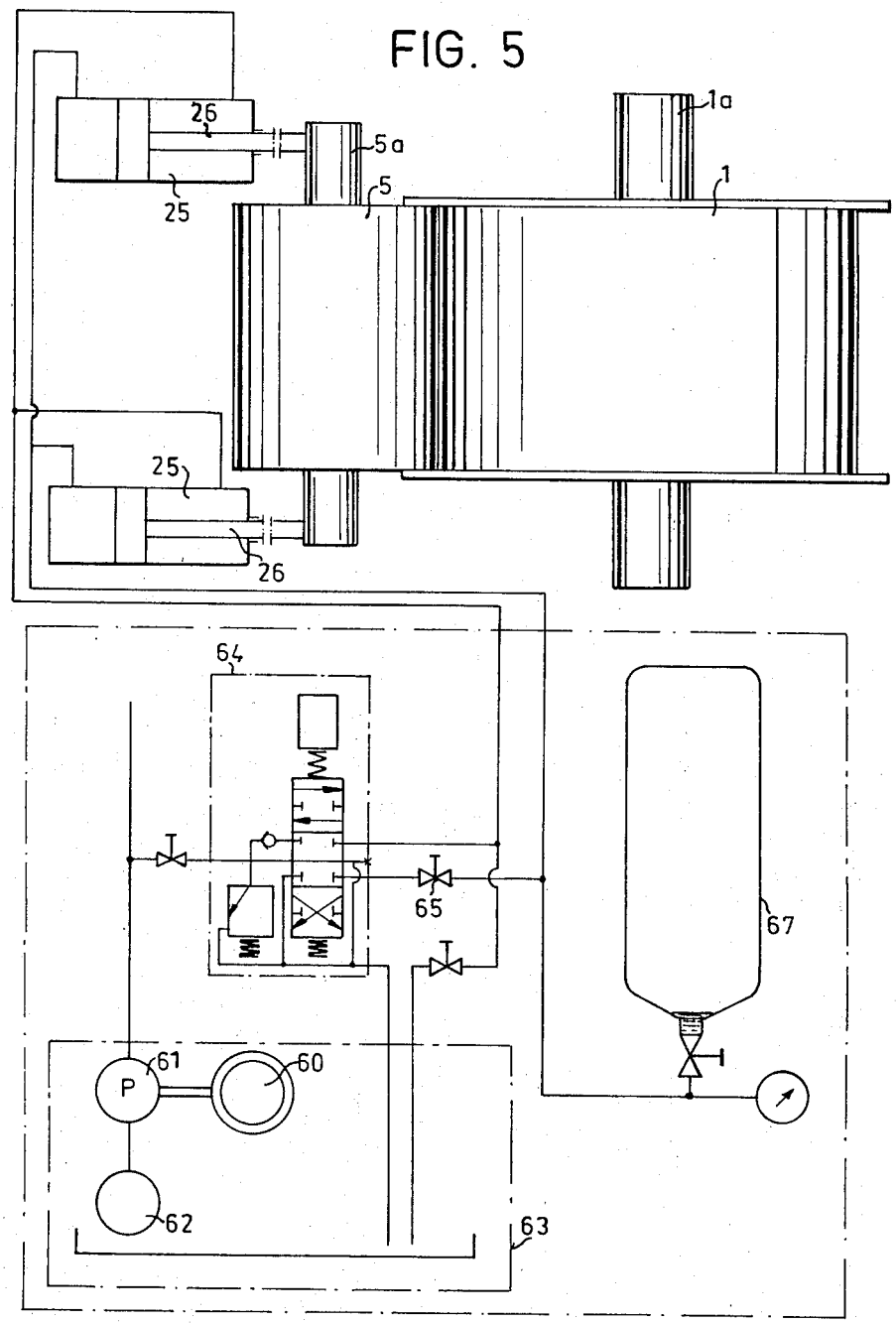
Figure 6:
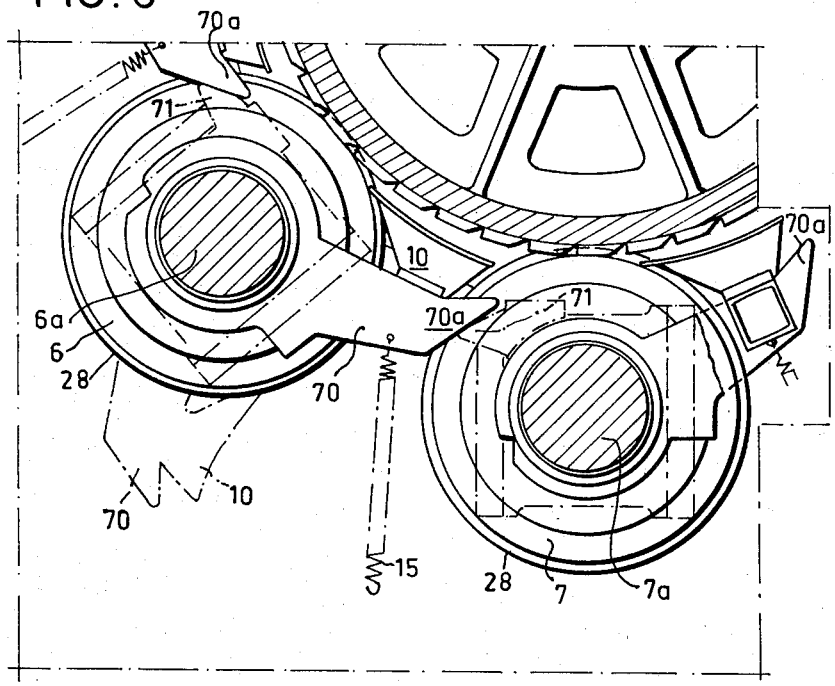

FIG. 1 is a lateral elevation of the bark press. FIG. 2 is an enlarged vertical sectional view of the vital parts of the press. FIG. 3 is a fragmentary sectional view of the central roller and a squeeze roller. FIG. 4 is an axial sectional view illustrating the drive of the rollers. FIG. 5 is a diagrammatic view of the hydraulic-pneumatic system for pressing the squeeze rollers against the central roller. FIG. 6 is a fragmentary view of a modified arrangement for mounting a scrape and guide member.

The main part of the bark press is a central roller 1 which is mounted in stationary bearings 2 secured to the frame 3, 4 of the press. Four squeeze rollers 5 to 8 are adapted to be pressed against the central roller. The first squeeze roller 5 is located immediately below a feed chute 9 which communicates with a conveyor, not shown, for wet mass of bark. The axis of the squeeze roller 5 lies on a somewhat higher plane than the axis of the central roller 1, and both rollers form between themselves a gap into which the mass of bark is supplied under the action of gravity.

In the embodiment illustrated, the diameter of the four squeeze rollers 5 to 8 is equal to half the diameter of the central roller 1. As will be seen from the drawings the squeeze rollers are arranged such as to contact the lower periphery of the central roller in spaced apart relation. Scrape and guide members 10 are in engagement with each of the squeeze rollers 5, 6 and 7. Each of the scrapers is supported by an arm 13 which is pivotally mounted on the shaft of the next following squeeze roller. Each scraper 10 is pressed against the respective squeeze roller by means of a tension spring 15 one end of which is connected to a holder 17 provided with an adjustable screw 16. Each scraper 10 extends at a distance from the periphery of the central roller to the region of the following squeeze roller and serves as a guide member for the mass of bark advancing between the squeeze rollers and the central roller. The rear portion of the guide member 10 is not in contact with the following squeeze roller but is slightly spaced therefrom so as to form a slot through which expressed liquid can be discharged.

Each of the shafts 5a to 8a of the squeeze rollers 5 to 8 is mounted at both ends in bearings 18 which are radially movable relative to the central roller. To this end the bearings 18 are provided with guide plates 19 which permit rectilinear displacement of the bearings along guide means 20 formed in the frame 3, 4 of the bark press.

The squeeze rollers 5 to 8 are pressed against the roller 1 by means of hydraulic devices the cylinders 25 of which are mounted in the frame of the press and the pistons 26 of which are connected to the respective bearing 18. All of the hydraulic devices 25, 26 are connected to a common hydraulic system, and the relation between the pressures exerted on the central roller by the various squeeze rollers is always constant and is determined by the dimensions of the various cylinders and pistons.

Preferably the hydraulic devices are constructed such that the first squeeze roller 5 exerts the lowest pressure whereas the last squeeze roller 8 exerts the highest pressure.

The central roller 1 has peripherally extending ridges 27 corresponding to peripheral ridges 28 on the various squeeze rollers. The first squeeze roller 5 and the central roller 1 also have axially extending sharp-edged indentations 29 and 34, respectively, so that a cross-lined pattern is formed on the peripheral surfaces of these rollers. Due to this arrangement long strips of bark are partly cut to pieces, and the admission and distribution of the mass of bark is facilitated.

Provided at the discharge place for the mass of bark is a scraper 30 which is in contact with the central roller 1 and is pivotally mounted on a shaft 31. The scraper is kept in position by a holder 32. Additional members, not shown, may be provided for effective removal from the central roller of mass of bark adhering thereto.

A pivotally mounted scraper 36 acted upon by a spring 35 engages the last squeeze roller 8 for scraping off therefrom mass of bark adhering thereto. The scraper 36 has a rearward extension and forms together with lateral plates 37 a discharge chute for the dewatered cake or bark. Advantageously the discharge chute communicates with a furnace, not shown.

As will be seen from FIGS. 2 and 3, the central roller 1 is provided on both sides with peripheral, annular lateral flanges 1b between which the squeeze rollers 5 to 8 are rotating. The flanges 1b prevent mass of bark and liquid from being discharged laterally.

The radial peripheral ridges 27, 28 on the central roller and on all squeeze rollers may be U-shaped and about ⅝ inch high. The pitch of the ridges may be between 1 inch and 1¼ inches. As will be seen from FIG. 3, the tops of the ridges on the central roller extend into the spaces between the ridges on the squeeze rollers, and vice versa.

The indentations 34, 29 in the central roller 1 and in the first squeeze roller 5, respectively, may extend axially but preferably they make an angle between 0° and 35° with the direction of the axis. An angle of about 20° is though to be suitable. The distance between two adjacent indentations 34 in the central roller 1 may be about 8 inches and the distance between the indentations in the squeeze roller 5 may be about 4 inches. The indentations 34 and 29 extend in different directions relative to the axes of the rollers. As a result breaking and advancing of the mass of bark is facilitated because there is always an indented portion of the rollers in engagement with the bark.

The wet mass of bark supplied to the bark press often contains large pieces of wood and other undesired matter which renders the operation of the press difficult. For this reason the squeeze rollers are elastically pressed against the central roller so as to be able to move resiliently back as foreign matter passes between the rollers. Certain objects, such as small pieces of wood and the like, can be broken and ground in the press whereas other such pieces pass between the rollers and are discharged together with the dewatered cake or bark.

FIG. 5 illustrates a diagram of a preferred hydraulic-pneumatic system for forcing the squeeze rollers against the central roller.

In addition to the hydraulic devices 25, 26 the hydraulic equipment comprises a pump assembly including a motor 60, a pump 61, a strainer 62 and a reservoir 63 and also comprises four four-way valves 64 with appertaining cut-off valves 65. Included in the circuit from each four-way valve 64 to the respective hydraulic device 25, 26 for pressing a squeeze roller against the central roller 1 is a pneumatic pressure relief tank 67 which permits resilient backward movement of the respective squeeze roller. Instead thereof or in addition thereto mechanical spring devices, not shown, may be used for pressing the squeeze rollers against the central roller.

In order to prevent metallic objects which could damage the rollers from passing through the press, an electromagnet, not shown, is preferably provided in the gap between the first squeeze roller 5 and the central roller.

An example of a possible way of driving the press is illustrated in FIGS. 1 and 4. A geared motor 42 connected to a clutch drives the central roller 1 and the various squeeze rollers 5 to 8 via a gear train 42a, 43, 44, 45, 46. The teeth 45a, 46a of the gear wheels 45, 46, respectively, are devised such that the gear wheel 46 can be rotated and at the same time moved radially relative to the gear wheel 45 and the central roller 1.

FIG. 6 illustrates a modified device for mounting the scrapers 10 pressed against the squeeze rollers. In this modification the scraper 10 is carried by an arm 70 which is pivotally mounted on the same shaft, for instance 6a, that carries the squeeze roller 6 against which the scraper is pressed. The arm 70 has a projecting portion 70a in engagement with a support 71 mounted on the shaft 7a of the next following squeeze roller. The support can be adjusted in different positions for controlling the force of the scraper exerted on the respective squeeze roller. Similar to the arm 13 in the above described embodiment the arm 70 is acted upon by a tension spring 15 the force of which need not be adjustable in the embodiment shown in FIG. 6.

After turning the arm 70 to the position shown by chain-dotted lines in FIG. 6 the scraper 10 is readily movable from the arm and exchangeable. The edge of the scraper pressed against the squeeze roller is preferably provided with ridges corresponding to the ridges of the squeeze roller.

Types of driving devices other than that illustrated in FIGS. 1 and 4 are conceivable. For instance, each roller may be provided with an individual driving device, such as a hydraulic motor or the like.

What I claim is:

1. A bark press comprising a central roller mounted on a substantially horizontal shaft and having an axis of rotation coinciding with the axis of said shaft, at least four squeeze rollers having smaller diameters than said central roller said squeeze rollers having shafts mounted in movable bearings, pressing means for elastically pressing said squeeze rollers toward said central roller with said four squeeze rollers adapted to directly engage a mass of bark passing between said squeeze rollers and said central roller, scrape and guide means for scraping bark from said squeeze rollers and guiding the path of the bark to a gap between a next following squeeze roller and said central roller, said scrape and guide means being between said squeeze rollers and being spaced apart from the periphery of said central roller, means for introducing a wet mass of bark into a gap between said central roller and a first squeeze roller of said squeeze rollers, said first squeeze roller having an axis of rotation lying substantially level with or above the axis of rotation of said central roller, said first squeeze roller having peripheral ridges corresponding to peripheral ridges on said central roller, said first squeeze roller having longitudinal indentations for breaking and advancing a mass of bark in said press, said indentations making an angle with the axis of said first squeeze roller and means for discharging de-watered bark from a last squeeze roller of said squeeze rollers.

2. A bark press as claimed in claim 1, wherein the bearings for the squeeze rollers are rectilinearly movable radially toward the axis of the central roller.

3. A bark press as claimed in claim 1, wherein each of said scrape and guide means extends from one squeeze roller to the region in the proximity of a next following squeeze roller, said means being carried by an arm which is pivotally mounted on a shaft that carries the squeeze roller against which the scrape and guide means is pressed, said arm engaging a support member provided on a shaft of the next following squeeze roller.

4. The bark press of claim 1 characterized in that the forces exerted on the squeeze rollers by said pressing means increase in the direction of advancement of the mass of bark.

5. The bark press of claim 1 characterized in that a slot is provided between each of said scrape and guide means and each following squeeze roller to allow expressed liquid to be discharged.

6. The bark press of claim 1 characterized in that the axis of the last squeeze roller provided at the exit for the de-watered bark is lower than the axis of the first squeeze roller.

References Cited

UNITED STATES PATENTS

| | | | |
|---|---|---|---|
| 600,518 | 3/1898 | Dillon | 100—166 |
| 1,055,298 | 3/1913 | Bertina | 100—166 |
| 1,539,502 | 5/1925 | Okrassa | 100—166 |
| 2,691,339 | 10/1954 | Edwards | 100—170 |
| 2,711,130 | 6/1955 | Guettler | 100—153 |
| 2,966,112 | 12/1960 | Guettler | 100—153 X |
| 3,089,409 | 5/1963 | Tretheway et al. | 100—162 |
| 3,148,565 | 9/1964 | Hunter | 100—170 X |

LOUIS O. MAASSEL, *Primary Examiner.*